(12) United States Patent
Qiu et al.

(10) Patent No.: US 9,590,812 B2
(45) Date of Patent: Mar. 7, 2017

(54) METHOD AND DEVICE FOR CHARGING LOCAL TRAFFIC ON WIRELESS SIDE

(71) Applicant: ZTE CORPORATION, Shenzhen, Guangdong Province (CN)

(72) Inventors: Kaifu Qiu, Shenzhen (CN); Zhixiong Zhou, Shenzhen (CN); Zhuo Cui, Shenzhen (CN); Jun Huang, Shenzhen (CN); Guiliang Li, Shenzhen (CN); Hong Lai, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/411,204

(22) PCT Filed: Jun. 25, 2013

(86) PCT No.: PCT/CN2013/077866
§ 371 (c)(1),
(2) Date: Dec. 24, 2014

(87) PCT Pub. No.: WO2013/178113
PCT Pub. Date: Dec. 5, 2013

(65) Prior Publication Data
US 2015/0319003 A1 Nov. 5, 2015

(30) Foreign Application Priority Data
Aug. 21, 2012 (CN) .......................... 2012 1 0297901

(51) Int. Cl.
*H04W 72/12* (2009.01)
*H04W 4/24* (2009.01)
(Continued)

(52) U.S. Cl.
CPC ...... *H04L 12/1482* (2013.01); *H04L 12/1403* (2013.01); *H04L 61/2015* (2013.01);
(Continued)

(58) Field of Classification Search
CPC .... H04L 12/14; H04L 12/1482; H04M 15/41; H04M 15/44; H04W 4/26
(Continued)

(56) References Cited

U.S. PATENT DOCUMENTS

2005/0044138 A1 2/2005 Albert et al.
2010/0077056 A1 3/2010 Kokal et al.
(Continued)

FOREIGN PATENT DOCUMENTS

CN 1725697 A 1/2006
CN 101237332 A 8/2008
(Continued)

OTHER PUBLICATIONS

S2-120637; Charging solution for the BB2; ZTE; SA WG2 Meeting #89; Feb. 6-10, 2012, Vancouver, British Columbia, Canada.
(Continued)

*Primary Examiner* — Khawar Iqbal
(74) *Attorney, Agent, or Firm* — Ling Wu; Stephen Yang; Ling and Yang Intellectual Property

(57) ABSTRACT

The embodiment of the present document discloses a method and apparatus for charging local traffic on a wireless side, which relate to the communication field. The method comprises: a wireless-side network element collecting data traffic and a corresponding IP address of user equipment (UE), searching for UE identification information matching the IP address, and updating the data traffic to a charging data record (CDR) of the corresponding UE, and sending to a charging gateway (CG). The embodiment of the present document can support charging on a wireless access side.

14 Claims, 2 Drawing Sheets

(51) Int. Cl.
*H04L 12/14* (2006.01)
*H04M 15/00* (2006.01)
*H04L 29/12* (2006.01)
*H04W 4/26* (2009.01)
*H04L 12/26* (2006.01)

(52) U.S. Cl.
CPC ........... *H04M 15/41* (2013.01); *H04M 15/44* (2013.01); *H04M 15/62* (2013.01); *H04M 15/8228* (2013.01); *H04W 4/24* (2013.01); *H04W 4/26* (2013.01); *H04L 43/028* (2013.01)

(58) Field of Classification Search
USPC ...... 455/406, 453, 414.1; 370/254, 259, 328
See application file for complete search history.

(56) References Cited

U.S. PATENT DOCUMENTS

| | | | | |
|---|---|---|---|---|
| 2012/0082161 | A1* | 4/2012 | Leung | H04L 12/4633 370/392 |
| 2012/0224528 | A1* | 9/2012 | Tapia | H04W 4/18 370/328 |
| 2013/0051313 | A1* | 2/2013 | Durand | H04M 15/00 370/328 |
| 2013/0273855 | A1* | 10/2013 | Cherian | H04W 4/005 455/68 |
| 2014/0112151 | A1* | 4/2014 | Olsson | H04W 8/08 370/237 |
| 2014/0153496 | A1* | 6/2014 | Kim | H04W 76/021 370/328 |
| 2014/0213278 | A1* | 7/2014 | Jin | H04W 28/085 455/453 |
| 2014/0323080 | A1* | 10/2014 | Mishkin | H04L 12/14 455/405 |
| 2014/0362807 | A1* | 12/2014 | Bhatnagar | H04W 4/00 370/329 |
| 2015/0189508 | A1* | 7/2015 | Abbott | H04W 4/021 455/411 |
| 2015/0215946 | A1* | 7/2015 | Raleigh | G06Q 30/0601 370/329 |
| 2016/0021409 | A1* | 1/2016 | Kelsen | H04N 21/2543 725/8 |
| 2016/0094972 | A1* | 3/2016 | Girard | G06Q 20/145 455/407 |
| 2016/0198349 | A1* | 7/2016 | Fox | H04W 28/08 455/422.1 |

FOREIGN PATENT DOCUMENTS

| | | |
|---|---|---|
| CN | 101883178 A | 11/2010 |
| CN | 101998347 A | 3/2011 |
| JP | 2004349925 A | 12/2004 |
| WO | 2011000740 A1 | 1/2011 |
| WO | 2011023061 A1 | 3/2011 |

OTHER PUBLICATIONS

3rd Generation Partnership Project;Technical Specification Group Services and System Aspects; Telecommunication management; Charging management; Packet Switched (PS) domain charging (Release 10); 3GPP TS 32.251 V10.9.0 (Jun. 2012).

* cited by examiner

METHOD AND DEVICE FOR CHARGING LOCAL TRAFFIC ON WIRELESS SIDE

TECHNICAL FIELD

The present document relates to the communication field, and in particular, to a method and apparatus for supporting charging the traffic, such as, local distributary, etc., on a radio access side (RAN).

BACKGROUND

Along with the development of the communication technology and the gradual popularization of the intellectual mobile phone, the data traffic in the wireless communication system appear a fast growing trend. If all traffics are transmitted to the core network for concentrated process, it will cause very great influence on the performance of the core network. In addition, it has always been an important difficult problem to solve the indoor coverage. In order to solve the problems, such as, the rapid growth and the indoor cover of the data traffic, the technology of the small-scale base station is rising progressively. In the small-scale base station, the data traffic is possible to shunt locally directly without passing through the core network. In addition, with the development of the technology, there may be the situation that the mobile phone interacts with the base station directly, that is, the traffic is already ended at the wireless side. Under the above-mentioned several situations, all the data will not pass the core network, and the core network is unable to percept the existence of the traffics, and is just unable to charge to the traffics. And the existing standard does not mention the related method and technology on how to support charging at the wireless side.

In the UMTS system, after the user completes the PDP activation, the serving GPRS supporting node (SGSN) and the network management GPRS supporting node (GGSN) will charge to the conversation respectively, to generate the SGSN charging recording data (S-CDR) and the GGSN charging recording data (G-CDR) respectively, and these two charging records will be transmitted to the charging gateway (CG) through the Ga interface. The CG will perform the combination process on the two, where the combination process is based on the GGSN address and the charging ID. The charging ID is assigned and transmitted to the SGSN by the GGSN when the charging starts, and both the S-CDR and the G-CDR will carry the GGSN address and the charging ID. After the combination process of the charging gateway completes, it will transmit the whole combined charging information to the charging center.

In the related art, it is mentioned when the information, such as the user traffic, etc., is collected locally, the CDR generated locally can be transmitted to the CG directly. But the procedure does not provide how to trigger charging, finish charging, and the specific information (such as the user identification IMSI) in the obtained CDR, and does not solve the problem of combining the local charging CDR into the whole charging record.

SUMMARY

The embodiment of the present document provides a method and apparatus for charging local traffic on a wireless side, which can better solve the problem of charging to the local data traffic by the radio access side.

According to one embodiment of the present document, a method for charging local traffic on a wireless side is provided, comprising:

a wireless-side network element collecting data traffic and an IP address of a user equipment (UE), and searching for UE identification information matching the IP address, and updating the data traffic to a charging data record (CDR) of the corresponding UE, and sending to a charging gateway (CG).

Preferably, the wireless-side network element obtains the UE identification information through monitoring a non-access layer (NAS) message interacted between the UE and a core network, in order to search for the corresponding CDR.

Alternatively, the wireless-side network element obtains the UE identification information through initiating an identification request to the UE, in order to search for the corresponding CDR.

Preferably, the wireless-side network element obtains the IP address of the UE carried during a packet data protocol (PDP) activation through monitoring the PDP activation, and matches the IP address with the obtained UE identification information.

Preferably, after the PDP activation, the wireless-side network element triggers a charging start, generates the CDR of the UE, and fills the UE identification information and a charging start time into the CDR.

Preferably, the wireless-side network element triggers a charging end through monitoring the NAS message interacted between the UE and the core network, and fills a charging end time into the CDR and sends to the CG through a Ga interface.

Preferably, according to the UE identification information, the charging start time and the charging end time, the CG combines the CDR and a serving GPRS supporting node charging data record (S-CDR) and a gateway GPRS supporting node charging data record (G-CDR), and reports a combination result to a charging center.

According to another embodiment of the present document, an apparatus for charging local traffic on a wireless side is provided, comprising:

a deep packet inspection (DPI) module, configured to collect data traffic and an IP address of a user equipment (UE), and a charging information generation module, configured to search for UE identification information matching the IP address, and update the data traffic to a charging data record (CDR) of the corresponding UE, and send the CDR to a charging gateway (CG).

Preferably, the apparatus further comprises:

a charging control module, configured to trigger a charging start and trigger a charging end.

Preferably, the apparatus further comprises:

a Ga interface module, configured to send the CDR to the CG through its Ga interface.

The embodiment of the present document monitors whether the UE wants to initiates or terminates the service through monitoring the NAS message between the UE and the core network, thus realizing the effective charging to the local traffic on the wireless side by the core network.

PREFERRED EMBODIMENTS OF THE PRESENT DOCUMENT

The preferred embodiments of the present document are described in detail with reference to the accompanying drawings hereinafter. It should be understood that, the embodiments illustrated hereinafter are only used to describe and explain the present document, rather than to limit the present document. The embodiments and the features in the embodiments can be combined with each other when there is no conflict.

When the UE sets up a service connection with the network, according to the standard, the SSGN and the GGSN will charge respectively, and generate the S-CDR and the G-CDR. The embodiment of the present document provides a method and apparatus for charging local traffic on the wireless side, and it charges to the local data traffic at the RAN side, that is to say, if there is the traffic which is terminated on the RAN side or is shunted locally, then the RAN side needs to support the local charging too. Now the present document is explained in detail by combining FIG. 1-FIG. 4.

Figure 1:
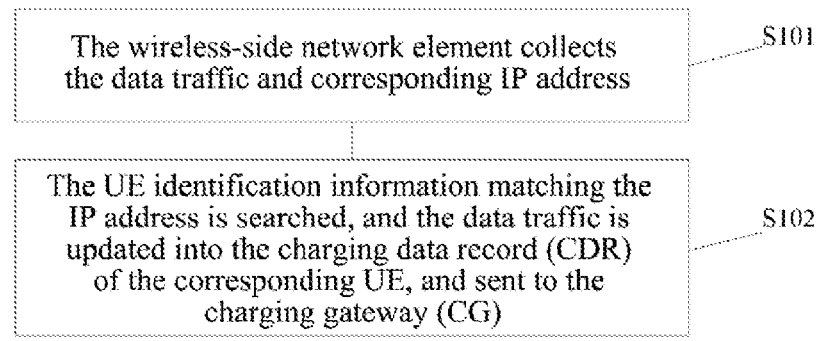
FIG. 1 is a functional block diagram of charging for local traffic on a wireless side provided by an embodiment of the present document.

FIG. 1 is a functional block diagram of charging for local traffic on a wireless side provided by an embodiment of the present document. As shown in FIG. 1, it includes the following steps.

In step S101, the wireless-side network element collects the data traffic and the IP address of the UE.

In step S102, the UE identification information matching the IP address is searched, and the data traffic is updated into the charging data record (CDR) of the UE corresponding to the UE identification information, and sent to the charging gateway (CG).

Wherein, after the UE is adhered to the network, the wireless-side network element obtains the UE identification information through monitoring a non-access layer (NAS) message interacted between the UE and the core network or through initiating an identification request to the UE. When the UE imitates the PDP activation procedure, the wireless-side network element obtains the IP address of the UE carried during the PDP activation, and matches the IP address with the UE identification information, and triggers a charging start after the PDP activation is successful, generates the CDR of the UE, and fills the UE identification information and a charging start time into the CDR. When the local traffic is generated, the wireless-side network element can find the CDR of the corresponding UE through the matching relationship between the collected IP address and the UE identification information, and record the generated local traffic. When the wireless-side network element confirms that the UE terminates the service through monitoring the NAS message interacted between the UE and the core network, it triggers a charging end, and fills a charging end time into the CDR and sends the CDR to the CG through a Ga interface, so that the CG combines the CDR with the S-CDR and the G-CDR according to the UE identification information, the charging start time and the charging end time, and report a combination result to a charging center.

Figure 2:
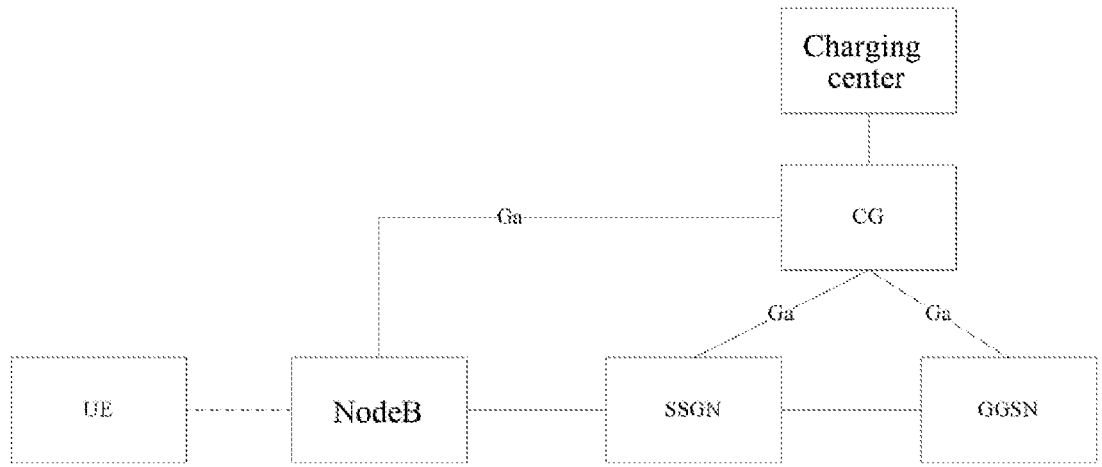
FIG. 2 is a system block diagram of charging for local traffic on a wireless side provided by an embodiment of the present document.

FIG. 2 is a system block diagram of charging for local traffic on a wireless side provided by an embodiment of the present document. As shown in FIG. 2, it includes a wireless-side network element (that is, the RAN device, NodeB), the SSGN, the GGSN, the CG, and the charging center; and in order to support the charging at the radio access side, the RAN device needs to monitor the NAS message of the UE, and the workflow of the system is as follows.

1, when the user is adhered to the network, the RAN device obtains the UE identification information therefrom, and the identification information can be IMSI, IMEI, etc. If it cannot obtain the UE identification information when the user is adhered to the network, then the RAN device simulates performing the Identity Request procedure, to obtain the UE identification information.

2, the RAN device monitors the PDP activation procedure, obtains the IP address of the UE therefrom and matches it with the UE identification information, and triggers the charging start.

3, the RAN device periodically collects the locally processed data traffic (including local shunting and local ending) and the corresponding IP address, and searches for the UE identification information matched with the IP addresses, and updates the data traffic into the CDR of the UE. The CDR includes the identification information of the UE, the uplink data traffic, the downlink data traffic, the charging start time and the charging end time, etc.

4, the RAN device monitors the NAS message, triggers the charging end when monitoring that the UE terminates the service, that is, when the session is ended, and sends the CDR to the CG through the Ga interface.

5, after the CG receives the CDR, according to the information, such as, the UE identification information and the start time and the end time of the charging, etc., it combines the CDR at the wireless side into the whole CDR, and then transmits to the charging center, that is, the input of the combination procedure includes the CDR generated at the wireless side, the S-CDR from the SSGN and the G-CDR from the GGSN.

Figure 3:
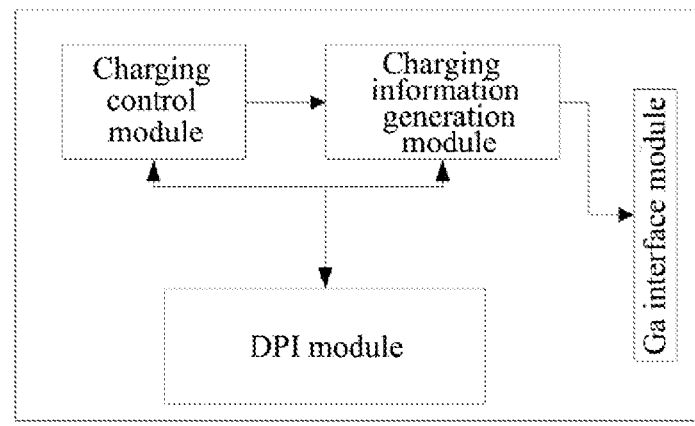
FIG. 3 is an apparatus block diagram of charging for local traffic on a wireless side provided by an embodiment of the present document.

FIG. 3 is an apparatus block diagram of charging for local traffic on a wireless side provided by an embodiment of the present document. As shown in FIG. 3, in order to support the charging, it mainly includes a deep packet inspection (DPI) module, a charging information generation module, a charging control module and a Ga interface module.

The DPI module is used for collecting the data traffic and the corresponding IP address of the UE, to be specific, the main function of the DPI module is to perceive the NAS message, including the following aspects.

1, it is responsible for collecting the charging information, including the locally processed data traffic (for example, local shunting or local ending) and the source IP address and the target IP address corresponding to the data traffic. By taking the user visiting sohu as an example, during the uplink, that is, the user→sohu, the source IP address is the IP address of the user, and the target IP address is the IP address of the sohu server. During the downlink: that is, sohu→the user, the source IP address is the IP address of the sohu server, and the target IP address is the IP address of the user. No matter uplink or downlink, it needs to draw and know is mainly the IP address of the user.

2, it monitors the NAS message between the core network and the UE, and obtains the UE identification information and the IP address from it.

3, it monitors the NAS message of the service initiation and the service termination, thus making the charging control module trigger the charging start and trigger the charging end.

The charging control module is configured to trigger the charging start and trigger the charging end, it mainly receives the input of the DPI module, maintains the corresponding relationship of the UE identification information and the IP address, and knows the session start and end, etc., thus trigging the charging start and end. If the UE identification information is not obtained in the information obtained by the DPI module, then it simulates the Identity Request procedure, to obtain the UE identification information.

The charging information generation module is configured to search for the UE identification information matching the IP address, and to update the collected data traffic into the CDR of the corresponding UE and sends it to the charging gateway CG. That is to say, as to the charging information generation module, it has the following main functions.

1, it accepts the control of the charging control module, generates one CDR when triggering the charging start, and fills the static part therein, including the UE identification information, the charging start time, etc.

2, it draws the charging information from the DPI module regularly, matches to the corresponding UE identification information according to the IP address of the UE in the charging information, thus updating the data traffic to the corresponding field in the CDR of the UE. The data traffic includes the uplink data traffic and the downlink data traffic.

3, when the charging control module triggers the end, it fills the charging end time in the CDR, and transmits the CDR to the Ga interface module.

The Ga interface module is used for sending the CDR from the charging information generation module to the CG through its Ga interface. That is to say, the main function of the Ga interface module lies in the establishment of the charging reporting channel, and realizing the Ga interface, that is, the GTP protocol is required to realize, thus realizing reporting the CDR from the base station to the charging gateway CG.

Figure 4:
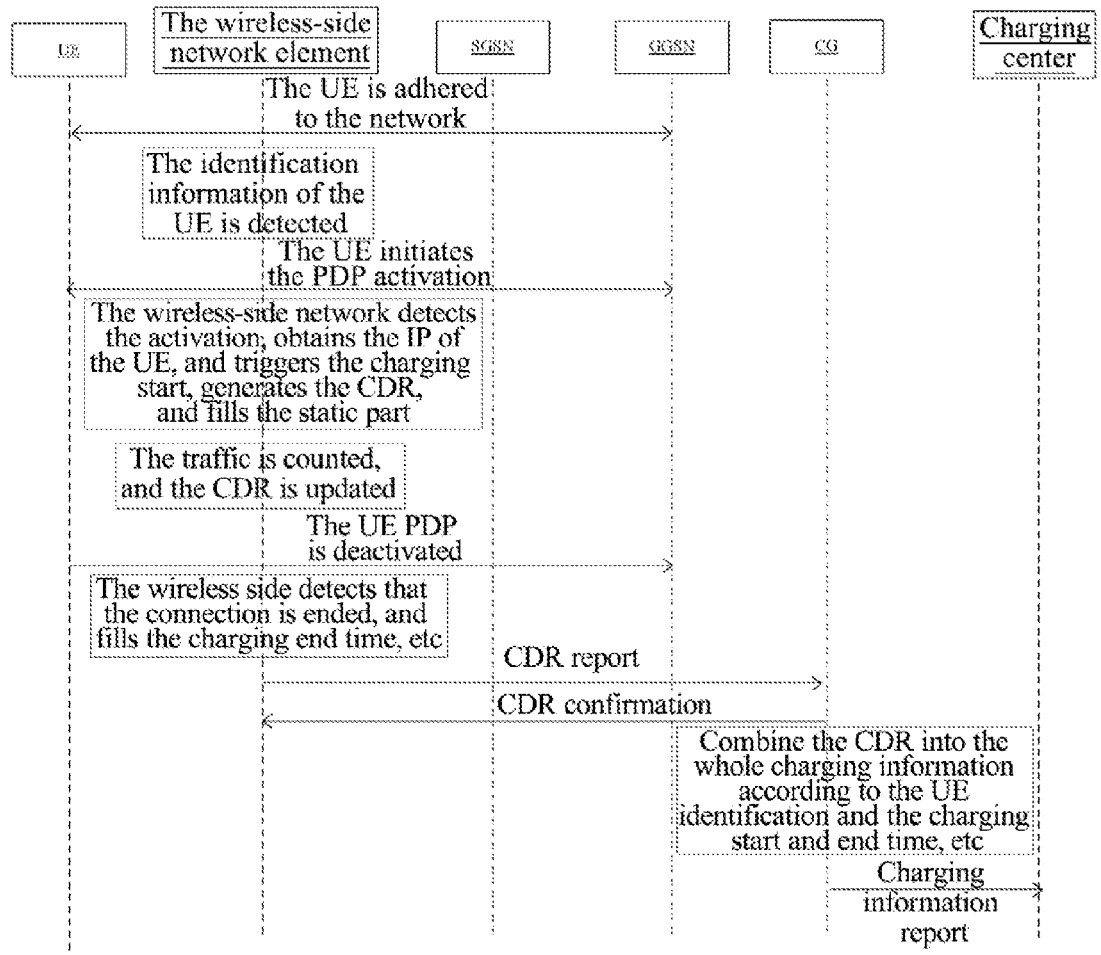
FIG. 4 is a system flow chart of charging for local traffic on a wireless side provided by an embodiment of the present document.

FIG. 4 is a system flow chart of charging for local traffic on a wireless side provided by an embodiment of the present document. As shown in FIG. 4, it includes the following aspects.

1, when the UE is adhered to the network, that is, the UE reports its related information to the core network for starting up, the UE interacts the NAS message with the core network, wherein, the NAS message carries the UE identification information. The DPI module monitors and obtains the UE identification information (such as the IMSI, the IMEI, etc.); and if it is not obtained, then the wireless-side network element initiates the Identity Request procedure, to obtain the UE identification information.

The Identity Request procedure was a process between the core network and the UE, in order to obtain the UE identification information, the wireless-side network element simulates sending the Identity Request message to the UE, to require the UE to report its identification information, and after the UE reports it, the wireless-side network element intercepts the message, and analyzes out the UE identification information from the intercepted message.

2, when the UE needs to perform the PS service, it initiates the PDP activation procedure, the PDP activation procedure will carry the IP information assigned to the UE by the GGSN, and the DPI module detects the IP address of the UE, and matches the IP address with the UE identification information obtained in the 1st step.

Because it can only extract the corresponding IP address during the process of collecting the uplink and downlink data traffics, while the UE identification information is in the CDR, it needs to match the IP address with the UE identification information.

3, when the PDP activation is successful, the charging control module triggers the charging start, and the charging information generation module generates one CDR, and fills the static part therein, including the UE identification information, the charging start time, etc.

4, when the DPI module detects that there is the locally processed data traffic, the size of the data traffic (including uplink and downlink) and the IP address of the UE corresponding to the data traffic are recorded.

5, the charging information generation module extracts the data traffic and its IP address regularly, and matches to the UE identification information according to the IP, and updates the data traffic into the CDR of the corresponding UE.

6, when the DPI module detects the NAS message of the conversation end, that is, when the service connection is ended, the charging control module triggers the charging end.

7, when the charging control module triggers the charging end, the charging information generation module fills the charging end time, etc., in the CDR, and transmits the CDR to the Ga interface module.

8, the Ga interface module transmits the CDR to the charging gateway CG.

9, after the CG receives the CDR, it associates the CDR, the S-CDR and the G-CDR through the UE identification information, the charging start time and the charging end time, and combines the charging information of the three.

The CDR from the wireless side, the S-CDR from the SGSN and the G-CDR from the GGSN all record the charging start time, the end time, and the UE identification information when the UE surfs the internet, and the CG combines the CDR, the S-CDR and the G-CDR with same or very similar identification information, and the charging start and end time, that is to say, to combine these three CDRs into one CDR.

10, the CG transmits the combination result to the charging center.

The embodiment of the present document charges to the local traffic at the RAN side, which involves the process to the local charging information by the RAN device and the network element of the core network, and the above descriptions are performed based on the UMTS system, and its principle and technology can also be in common use with other systems, such as, the GSM, the CDMA, the TD-SCDMA, the LTE, etc.

In sum, the embodiment of the present document has the following technical effects:

1, the embodiment of the present document realizes the effective charging to the local traffic on the wireless side by the core network through triggering the charging start and the charging end effectively.

2, the embodiment of the present document combines the CDR at the wireless side into the whole charging record through the UE identification information, the charging start and end time, and solves the problem in combining the local charging into the whole charging record.

The above description is only the preferred embodiments of the present document and is not intended to limit the present document. The present document can have a variety of other embodiments. Those skilled in the art can make the corresponding modifications and variations according to the present document without departing from the spirit and essence of the present document. And all of these modifications or the variations should be embodied in the scope of the appending claims of the present document.

Obviously, it can be understood by those skilled in the art that each module or each step above-mentioned in the present document can be implemented by the universal calculating apparatus, and they can be integrated in a single calculating apparatus, or distributed in the network made up by a plurality of calculating apparatus. Alternatively, they can be implemented by the executable program codes of the calculating apparatus. Accordingly, they can be stored in the storage apparatus and implemented by the calculating apparatus, or they are made to each integrated circuit module respectively, or a plurality of modules or steps therein are made into the single integrated circuit module to be implemented. This way, the present document is not limit to any specific form of the combination of the hardware and software.

INDUSTRIAL APPLICABILITY

The embodiment of the present document realizes the effective charging to the local traffic on the wireless side by the core network.

What we claim is:

1. A method for charging local traffic on a wireless side, comprising:
    matching, by a wireless-side network element, obtained user equipment (UE) identification information and obtained an IP address of a UE;
    detecting and collecting, by the wireless-side network element, locally processed data traffic and a corresponding IP address of the UE, wherein the locally processed data traffic is data traffic which does not pass a core network, and shunts locally or is ended at the wireless-side network element;
    searching for, by the wireless-side network element, the UE identification information matching the corresponding IP address of the UE, and updating the locally processed data traffic to a charging data record (CDR) of the UE corresponding to the UE identification information; and
    sending, by the wireless-side network element, the CDR of the UE to a charging gateway (CG) to combine with a serving GPRS supporting node charging data record (S-CDR) and a gateway GPRS supporting node charging data record (G-CDR) and report to a charging center;
    wherein, the wireless-side network element includes a radio access network and a NodeB; and
    the method further comprises: monitoring, by the wireless-side network element, packet data protocol (PDP) activation, and after the PDP activation, the wireless-side network element triggering a charging start and generating the CDR of the UE, and when the charging starts, filling the UE identification information and a charging start time into the CDR of the UE; and
    triggering, by the wireless-side network element, a charging end through monitoring NAS messages interacted between the UE and the core network.

2. The method according to claim 1, further comprising: obtaining, by the wireless-side network element, the UE identification information through monitoring non-access layer (NAS) messages interacted between the UE and a core network.

3. The method according to claim 2, further comprising: obtaining, by the wireless-side network element, the IP address of the UE carried during packet data protocol (PDP) activation by monitoring the PDP activation.

4. The method according to claim 1, further comprising: obtaining, by the wireless-side network element, the UE identification information through initiating an identification request to the UE.

5. The method according to claim 4, further comprising: obtaining, by the wireless-side network element, the IP address of the UE carried during packet data protocol (PDP) activation by monitoring the PDP activation.

6. The method according to claim 1, further comprising:
    when the charging ends, filling a charging end time into the CDR of the UE; and
    sending the CDR of the UE to the CG through a Ga interface.

7. The method according to claim 6, further comprising: according to the UE identification information, the charging start time and the charging end time in the CDR of the UE, combining, by the CG, the CDR of the UE and the S-CDR and the G-CDR, and reporting a combination result to the charging center.

8. An apparatus for charging local traffic on a wireless side, comprising hardware performing instructions stored in a non-transitory computer readable medium which executes steps in following modules:
    a deep packet inspection (DPI) module, configured to match obtained user equipment (UE) identification information and obtained an IP address of a UE, detect and collect locally processed data traffic and a corresponding IP address of the UE, wherein the locally processed data traffic is data traffic which does not pass a core network, and shunts locally or is ended at the wireless-side network element; and
    a charging information generation module, configured to search for the UE identification information matching the corresponding IP address of the UE, and update the locally processed data traffic to a charging data record (CDR) of the UE corresponding to the UE identification information, and send the CDR of the UE to a charging gateway (CG) to combine with a serving GPRS supporting node charging data record (S-CDR) and a gateway GPRS supporting node charging data record (G-CDR) and report to a charging center;
    wherein, the wireless-side network element includes a radio access network and a NodeB; and
    wherein, the DPI module is further configured to: monitor NAS messages of a service initiation and service termination;
    the apparatus further comprises a charging control module, configured to trigger a charging start and trigger a charging end according to the NAS messages of the service initiation and the service termination detected by the DPI module, and when the charging starts, filling the UE identification information and a charging start time into the CDR of the UE.

9. The apparatus according to claim 8, wherein,
    the DPI module is further configured to: obtain the UE identification information through monitoring non-access layer (NAS) messages interacted between the UE and a core network.

10. The apparatus according to claim 8, wherein,
the DPI module is further configured to: obtain the UE identification information through initiating an identification request to the UE.

11. The apparatus according to claim 8, wherein, the charging information generation module is further configured to: generate the CDR of the UE when the charging control module triggers the charging start, and fill the UE identification information and a charging start time into the CDR of the UE.

12. The apparatus according to claim 11, further comprising:
a Ga interface module, configured to send the CDR of the UE to the CG through a Ga interface.

13. The apparatus according to claim 8, wherein, the charging information generation module is further configured to: when the charging control module triggers the charging end, fill a charging end time into the CDR of the UE.

14. The apparatus according to claim 13, further comprising:
a Ga interface module, configured to send the CDR of the UE to the CG through a Ga interface.

\* \* \* \* \*